Figure 1:
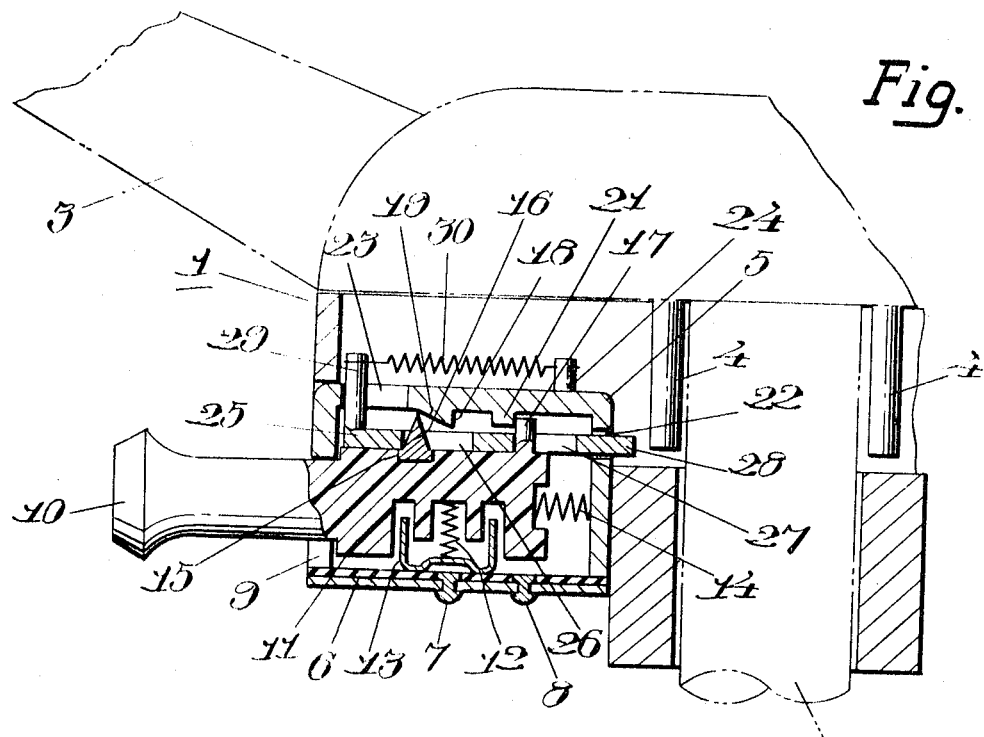

United States Patent
Suzuki

[15] 3,665,130
[45] May 23, 1972

[54] HAZARD WARNING SWITCH FOR AUTOMOTIVE VEHICLES

[72] Inventor: Masaru Suzuki, Aichi, Japan
[73] Assignee: Kabushiki-Kaisha Tokai Rika Denki Seisakusho, Aichi-ken, Japan
[22] Filed: Oct. 28, 1970
[21] Appl. No.: 84,664

[52] U.S. Cl. .................................... 200/61.27, 200/61.54
[51] Int. Cl. ............................................... H01h 3/16
[58] Field of Search .................................. 206/61.27–61.38; 200/61.54; 340/81 R, 81 F

[56] References Cited

UNITED STATES PATENTS

| | | | |
|---|---|---|---|
| 3,235,837 | 2/1966 | Brown | 200/61.35 X |
| 3,462,570 | 8/1969 | Poleschuk | 200/61.34 X |
| 3,500,008 | 3/1970 | McLure | 200/61.54 |
| 3,549,832 | 12/1970 | Ferryman | 200/61.54 X |
| 3,557,328 | 1/1971 | Winogrocki et al. | 200/61.27 |

Primary Examiner—H. O. Jones
Assistant Examiner—M. Ginsburg
Attorney—Shlesinger Fitzsimmons & Shlesinger

[57] ABSTRACT

This switch is mounted adjacent a vehicle's steering shaft. It has a reciprocable actuating member resiliently biased away from the steering shaft, and a movable cancelling lever resiliently biased toward the shaft, but normally held in a retracted position by the actuating member. The actuating member can be pushed manually toward the shaft to an operative position where it closes a hazard warning circuit, and also allows the lever to advance to a position where it is engageable with cam means on the steering shaft. The actuating member can be released from its actuating position either manually or by engagement of the advanced lever with the cam means, when the steering shaft is rotated. Also, the actuating member can be moved to its actuating position regardless of the position of the cam means.

3 Claims, 6 Drawing Figures

INVENTOR
Masaru Suzuki

BY Shlesinger, Fitzsimmons & Shlesinger
ATTORNEYS

INVENTOR
Masaru Suzuki

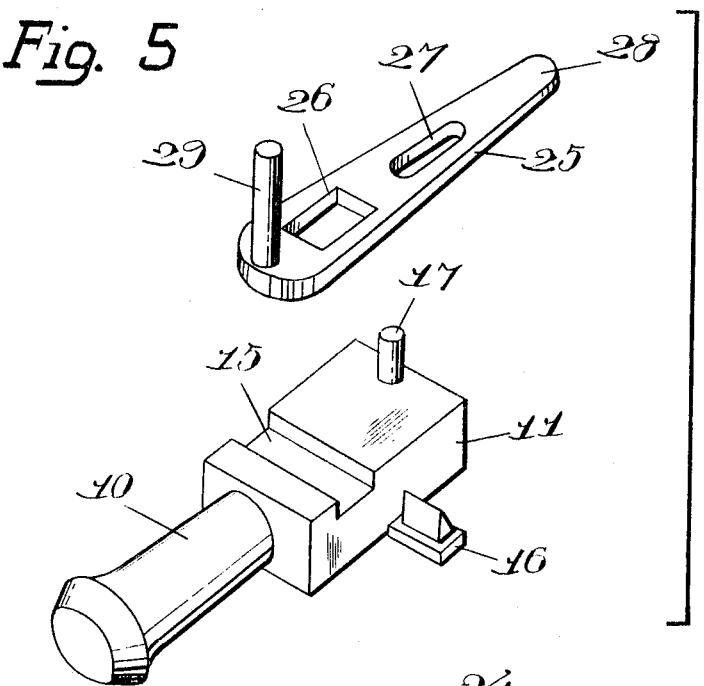
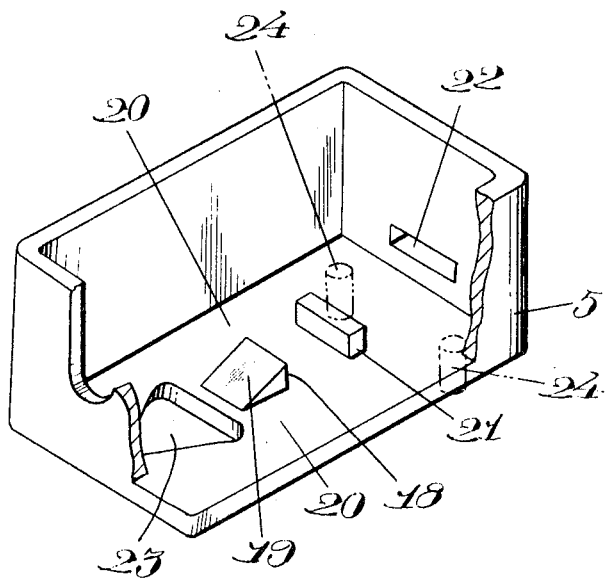

HAZARD WARNING SWITCH FOR AUTOMOTIVE VEHICLES

This invention relates to a hazard warning switch structure, and more particularly it relates to a hazard warning switch structure in a direction indicating signalling device for a vehicle.

It is most conventional that a hazard warning switch structure of the kind described has an actuating member which is movable from a disabled or inoperative position to an actuating position where a hazard warning circuit is closed for simultaneously turning on all the direction signalling lamps provided on the vehicle, and which is automatically returnable from the actuating position to the disabled position by the operation of cam means provided on the vehicle's steering device so as to be rotatable with the latter, when said steering device is operated. It is conventional also that in the hazard warning switch structure of the kind described, the forward end or pawl of such actuating member, which acts as a cancelling means for said member, when the latter is in its operative position, by the engagement with cam means when said cam means is turned along its orbital path of movement upon the turning operation of the steering device, is made integral with the actuating member. Such structure, however, does not allow the actuating member to be brought to the actuating position when the steering device is not in a neutral position and the cam means happens to be located in front of the protruding end of the actuating member, because the forward end or pawl of the actuating member impinges against the cam means and prevents the actuating member from being operated to its actuating position. This is a serious drawback for a hazard warning switch of this kind which has to be operable at any time when required, and which is required to be operated most often when the steering device is not in its neutral position by having been turned to locate the vehicle aside a road because of an emergency condition.

Hence, it is an object of the present invention to provide a hazard warning switch structure which is operable whenever required and without regard of the location of steering device, which coacts with a member of the structure to automatically actuate the latter from its actuating position to its disabled position, and still in which the shift of the structure from the actuating position to the disabled position is possible either automatically or manually.

Other objects and advantages of the present invention hazard warning switch structure shall become apparent from the following description.

Figure 2:
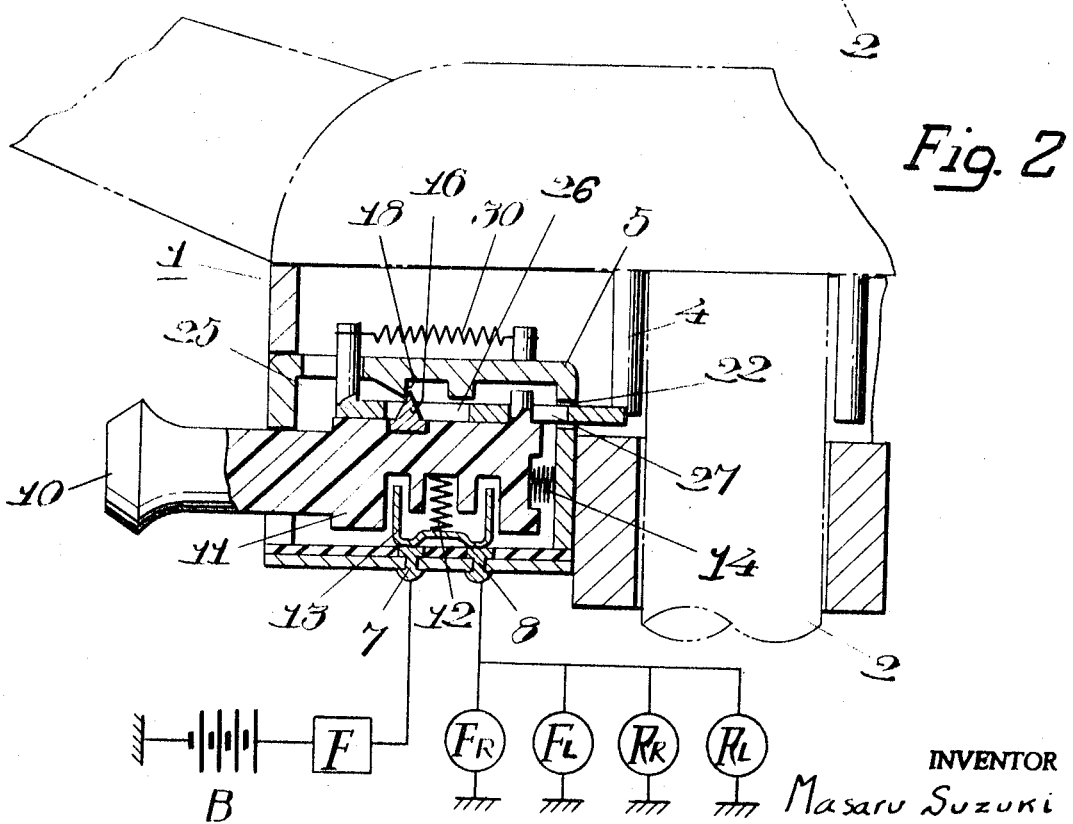
Figure 3:
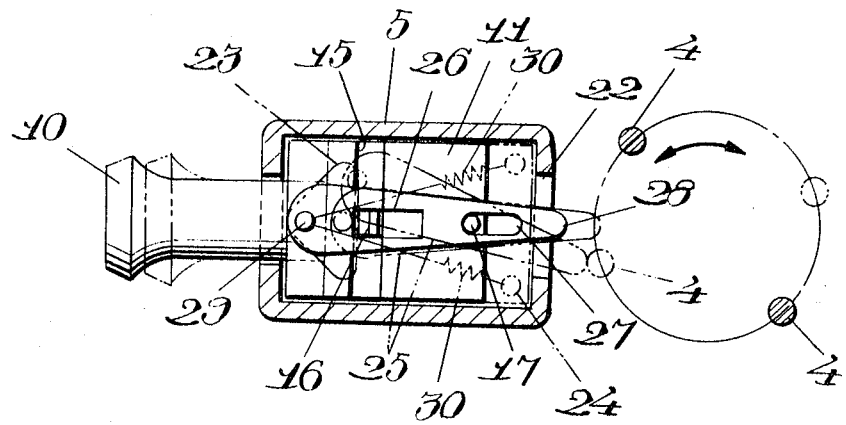
Figure 4:
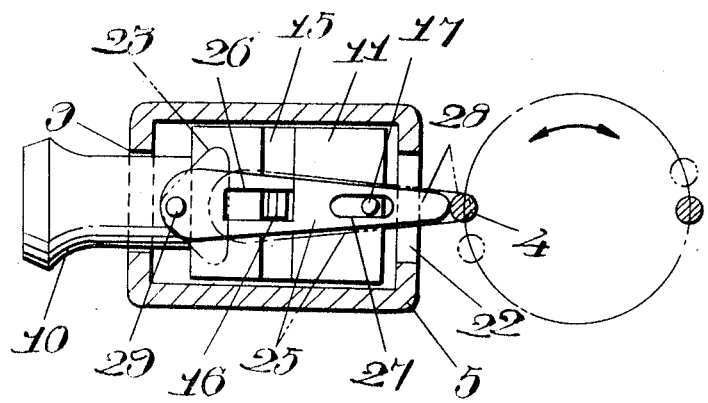

In the accompanying drawings in which a preferred embodiment of a hazard warning switch structure made in accordance with the present invention is illustrated;

FIG. 1 is a sectional side view of the switch structure which is shown in its disabled position where its associated hazard warning circuit is open, FIG. 2 is a sectional side view of the structure similar to FIG. 1, but in which the switch has been is brought to its actuating position where the hazard warning circuit is closed, FIG. 3 is a plan view of the switch structure, but with its upper wall portion removed, and showing, in chained lines, the coacting relation between its cancelling lever when in its operative or protruded position, and cam means provided on an associated steering device, FIG. 4 is a plan view similar to FIG. 3, showing, in chained lines, the coacting relation between the cam means and the cancelling lever, protrusion of the lever is prevented by the cam means, FIG. 5 is an exploded perspective view of the hazard warning actuating member and the cancelling lever which moves with the actuating member, and FIG. 6 is an upside-down perspective view of the box partly cut open, which houses the hazard warning actuating member and cancelling lever illustrated in FIG. 5, and constitutes a part of the present invention switch structure.

Now, referring to the drawing, a direction indicating signalling device generally designated by numeral 1 is accommodated within a housing that is fixedly mounted to a steering column of steering shaft 2, that surrounds said column. Cam members in the form of a plurality of spaced pins or rods 4 mounted either on the steering shaft or a hub of steering wheel 3 are rotatable in a path of movement, integrally with the turn of the steering device, so as to automatically return an actuating means of the signalling device, which has been operated from a neutral position to either a left or right actuating position for indicating the turn of a vehicle either to a left or right direction, into the neutral position upon the completion of turning of the steering shaft to said direction. Within the housing of the direction signalling device, there is provided a box 5 which is molded integrally with said housing or made independently from the housing and fixedly mounted inside the same for housing inside thereof a hazard warning actuating member 11 and a cancelling lever 25 which moves in cooperation with the actuating member. Said box 5 comprises an insulator 6 which is fitted to the bottom of the box and on which contacts 7 and 8 are mounted, and has an opening 9 provided in one of its lateral side walls which is located remote from the steering shaft 2. The hazard warning actuating member 11, which is made of an insulating material, is movable in its axial direction into an actuating position as shown in FIG. 2 or into a disabled position as shown in FIG. 1, by the operation of a knob 10 provided on the free end of the actuating member and slidably movable through the opening 9. The direction of movement of the hazard actuating member 11 passes radially through the center of steering shaft 2. A movable, resilient contact plate 13 is carried by the actuating member 11 at its undersurface and is urged towards the insulator 6 and contacts 7 and 8 by means of a spring 12 which is interposed between the undersurface of member 11 and the movable contact plate 13. A spring 14 which is mounted between the forward end of the hazard warning actuating member 11 and the lateral side wall of box 5 remote from the wall provided with the opening 9, works to normally urge the member 11 to its disabled position as shown in FIG. 1, at which the movable contact plate 13 does not engage any of the contacts 7, 8. However, said movable contact plate bridges the contacts 7 and 8 and thus electrically connects the former contact, which is connected to a battery B through a flasher unit F, to the latter contact, which is connected to all four turning direction signalling lamps Fr, Fl, Rr and Rl, when the actuating member 11 is manually pushed by the knob 10 against the resiliency of spring 24, to form a closed hazard warning circuit, as shown in FIG. 2. The spring 12 works not only to urge the movable contact plate 13 towards the insulator 6 and the fixed contacts 7 and 8, but also acts to urge the actuating member upwardly to a position where the upper surface of the member normally abuts against the lower surface of the cancelling lever 25 which is normally carried on the upper surface of the actuating member and slidable thereon. Upon movement of the member 11 into its actuating or disabled position, lever 25 is moved, respectively, to a protruded position where its forward end or pawl 28 comes within the path of movement of the cam means 4, or to a retracted position where said end is out of the path of movement of the cam means 4. During this movement lever 25 is maintained substantially at the same level, while being slidably held at said end 28 by a slot opening 22 provided in the lateral wall which is located at the side opposite the opening 9.

The actuating member 11 is provided, as best shown in FIG. 5, in its upper surface adjacent the knob 10, with a groove 15 which runs transversely to the axial direction of the actuating member 11, and carries an abutment piece 16 which has an inclined edge so as to allow said piece to be slidable along the groove. The actuating member 11 is further provided with a pin 17 which projects upwardly adjacent to its forward end.

As best shown in FIG. 6, the box 5 comprises, in addition to the insulator 6, contacts 7 and 8, the opening 9 and slot opening 22, for all of which an explanation has been given in the foregoing, a projection 18 projecting inwardly from the inner surface of the upper wall at such a location where it can engage at its forward edge with the inclined edge of the abutment piece 16 when this piece is advanced upon the operation of the actuating member 11 to operative position and can hold the actuating member at said position against the repulsive force of the spring 14 exerted on said actuating member. Said projection 18 has a height which corresponds to the distance which the actuating member can be depressed against the spring 12, and is provided at its rear edge with an inclined surface 19 which is sloped upwardly rearwardly of the actuating member. The lateral width of said projection 18 is such that there are provided at both sides thereof paths 20 and 20 which allow the inclined edge of the abutment piece 16 to be disengaged from the projection 18 and to retract to its normal position by the operation of spring 14 when said piece is moved laterally along the groove 15 from its central position. The box 5 further comprises a stop 21 projecting inwardly from the inner surface of the upper wall plate at a forward end thereof so as to be engageable with the pin 17 of the actuating member when it is at the disabled position, a triangular opening 23 having its apex directed towards the knob 10 and located between the projection 18 and the lateral side wall provided with the opening 9, and a pair of spaced pins 24 and 24 which project upwardly from the upper wall of box 5 adjacent the forward portion thereof.

The aforementioned cancelling lever 25, which is normally carried on the upper surface of the actuating member and slideable thereon while being slideably supported at its forward end 28 by the slot opening 22 of the box, is provided with an opening 26 through which the inclined edge of the abutment piece 16 protrudes and along which said edge is movable in the axial direction of the actuating member, in addition to its moveability in the transversal direction along the groove 15, an elongated opening 27 through which the pin 17 protrudes, and a pin 29 projecting upwardly, through the triangular opening 23 of the box, at a position adjacent to the rear end of the upper surface thereof. Numerals 30 and 30 indicate a pair of springs each suspended between the pin 29 and one of the pins 24 and operating, in cooperation with each other, the cancelling lever 25 normally to a neutral position or a position parallel to the axis of the hazard actuating member 11.

In the hazard warning switch structure having the constructions explained above, when the hazard warning actuating member 11 is at the disabled position as shown in FIG. 1, the inclined edge of the abutment piece 16, which projects through the opening 26 of lever 25 and is disposed at its central position in the groove 15 of the actuating member 11, is located immediately behind the foot of inclined surface 19, and the pin 17 of the actuating member abuts against the front side wall of the stop 21. The cancelling lever 25 is kept, at this time in its retracted position, being held there against the tendency by the springs 30 and 30 to advance it towards the steering shaft, by means of the engagement of the abutment piece 16 with the rear end of the opening 26 and of the pin 17 with the rear end of the elongated opening 27. The pin 29 of the lever 25 is consequently held in its retracted position and the springs 30 and 30 are expanded against their tension forces.

Whereas, when the member 11 is pushed manually by means of the knob 10 towards the steering shaft and brought into its actuating or on-position as shown in FIG. 2, the abutment piece 16 slides down the inclined edge of projection 18 until it engages in front of this projection so as to prevent the actuating member 11 from retreating to the disabled position by the force of spring 14. It is to be noted that prior to the detention of the abutment piece 16 by the projection 18, said abutment piece advances, being guided by the inclined surface 19 of the projection 18, and gradually depresses the actuating member against the spring 12 so that it can get over the ridge of the projection 18. At the actuating position, the hazard warning circuit is closed, as explained in the foregoing.

In consequence of the movement of the actuating member 11 into the actuating position, the cancelling lever 25 is advanced towards the steering shaft, being released from its engagement with the pin 17 of the actuating member by the resilient force of springs 30 and 30, and the forward end or pawl 28 thereof protrudes into the path of movement of cam means 4, as shown by the chained lines in FIG. 3. When a driver wishes to start his vehicle again after the clearance of an emergency condition because of which the vehicle is located, for example, on a side of road for repairs and for the indication of which the hazard warning actuating member is operated to the actuating position, the hazard warning circuit could be opened either manually or automatically. To wit, when the actuating member is depressed against the spring 12 by manual operation of the knob 10, the abutment piece 16 becomes disengaged from the projection 18 and is retracted to the disabled position by the resiliency of spring 14, while pushing back the lever 25 to the rear end of opening 26, towards its normal position, thus effecting the manual cancellation of hazard warning. In place of the manual cancellation of the hazard warning switch as mentioned in the above, or in case where the driver forgets the manual cancellation of the hazard switch, it might automatically be cancelled by the turning operation of the steering shaft and consequent rotation of cam means 4 which inevitably occurs subsequently to the start of driving the vehicle. The rotation of cam means 4 causes the abutment thereof with the forward end or pawl 28 of the cancelling lever 25 and forces said lever to swing about the pin 17, resulting in moving the abutment piece 16 laterally along the groove 15 by means of the opening 26 to such a position where said abutment 16 no longer engages the projection 18 and hence the actuating member 11 can retreat to the disabled position by the resiliency of spring 14, being accompanied by the abutment piece 16 which retreats to its normal position along either one of the paths 20 and 20. The cancelling lever 25 also retreats to its normal position, at that time.

As shown in solid lines in FIG. 4, even when the steering shaft 2 is not in a neutral position in consequence of having turned the steering wheel to park the vehicle alongside the road on account of an accident and the cam means happens to be in the path of the cancelling lever 25, the actuating member 11 can, nevertheless, be actuated to the actuating position, leaving the cancelling lever 25 in a partly protruded position. And, as soon as the cam means 4 clears the protruding path of the lever 25 by moving to the position such as indicated by chained lines in FIG. 4 as a result of driving the vehicle, said lever can protrude into the path of movement of cam means, as indicated by chained lines, resulting in automatic cancellation of the hazard warning switch in the same manner as explained in connection with FIG. 3.

What is claimed is: vehicle'

1. In combination with a direction indicating signalling device for a vehicle having a rotatable steering device, a housing surrounding a portion of said steering device, and a plurality of trip members mounted on said steering device to be rotatable in an orbital path upon rotation of the steering device to return said signalling device to a neutral position from either a left or right actuating position corresponding to energization of the vehicl's left or right direction signalling lamps for indicating the turn of the vehicle either to a left or right direction, a hazard warning switch structure comprising a box mounted on said housing and provided on one side thereof with a projection, fixed contact means provided on the opposite side of said box and including at least one contact for connection to an electric power source and at least one other contact for connection to all of said direction signalling lamps, a hazard warning actuating member mounted in said box for reciprocation in a direction radially of the axis of said steering device, and having thereon an operating knob projecting outwardly from said box, and carrying movable contact means which face said fixed contact means, and an abutment piece movably mounted on said actuating member so as to be movable with the actuating member in said radial direction, and also to be movable on said member transverse to said radial direction to be selectively engageable with said projection on said box, first resilient means normally urging said actuating member to an inoperative position where said movable contact means is not engaged with said fixed contact means, said actuating member being movable manually by said knob to an actuating position where said abutment piece releasably engages with said projection, and the movable contact means electrically connects said fixed contact means so as to close a hazard warning circuit which energizes said lamps, second resilient means being disposed between said actuating member and the movable contact means and being operative to normally urge said actuating member towards said one side of said box, and being also operative to urge said movable contact means towards the fixed contact means, a cancelling lever movably mounted on said actuating member so as to be slidable thereon in said radial direction and to be swingable transversely to said radial direction, and third resilient means urging said lever radially towards said steering device to an advanced position where it protrudes into the orbital path of movement of said trip members, when the actuating member is moved to actuating position, said lever being movable with said actuating member against the resistance of said third resilient means to a retracted position where said lever is withdrawn from the orbital path of movement of said trip members, when the actuating member is returned manually to its inoperative position, and being returnable from its advanced position to its retracted position by engagement with said trip members, when the latter are rotated with the steering device, said lever being swung by said trip members transversely to the radial direction of movement of the actuating member, thereby causing said abutment piece to move relative to the actuating member and to become disengaged from the projection on said box thereby permitting automatic return of said actuating member to its inoperative position through action of said first resilient means.

2. The combination as claimed in claim 1, in which the actuating member is returnable from its actuating position by first manually depressing it towards said fixed contact means against the resistance of said second resilient means so as to release the engagement between said abutment piece and the projection on said box, thereby to permit said first resilient means automatically to return said actuating member to its inoperative position and to return said cancelling lever to its retracted position.

3. A switching device for controlling the hazard warning circuit of an automotive vehicle of the type having a trip element movable with the steering device of the vehicle, comprising a housing supported by said steering device, a switch in said housing movable between open and closed positions selectively to energize and deenergize the hazard warning circuit of the vehicle, a first member in said housing movable between an active position in which it closes said switch to energize said circuit, and an inactive position in which it opens said switch, first resilient means urging said first member to its inactive position, means operable manually from the exterior of said housing to shift said first member to its active position, means for releasably latching said first member in its active position, a second member mounted in said housing for movement between an active position in which one end thereof projects into the path of movement of said trip element for engagement thereby, and an inactive position in which said one end is withdrawn from said path, and second resilient means constantly urging said second member into the path of movement of said element, means releasably connecting said members normally to move said second member to its active position when said first member is moved to its active position, and operative to release said latching means and return said members to their inactive positions, when said one end of said second member is engaged by said element, said connecting means including lost motion means operative, when said one end of said second member engages said element during movement of said members toward their active positions, to enable said first member to continue movement to its active position, and to remain latched in active position until, said element is disengaged from said second member, to permit continued movement of said second member to its active position, and is subsequently moved into engagement with said one end of said second member to release said latching means.

* * * * *